United States Patent
Ayres et al.

(10) Patent No.: US 9,438,547 B2
(45) Date of Patent: Sep. 6, 2016

(54) UNIFORM POLICY FOR SECURITY AND INFORMATION PROTECTION

(75) Inventors: Lynn Ayres, Redmond, WA (US); Jack Kabat, Sammamish, WA (US); Vikram Kakumani, Bellevue, WA (US); Mashuri Libman, Woodinville, WA (US); Benjamin Stull, Seattle, WA (US); Anatoly Koretsky, San Antonio, TX (US); Vidyaraman Sankaranarayanan, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/545,854

(22) Filed: Jul. 10, 2012

(65) Prior Publication Data

US 2014/0020044 A1  Jan. 16, 2014

(51) Int. Cl.
*G06F 21/62* (2013.01)
*H04L 12/58* (2006.01)

(52) U.S. Cl.
CPC ........... *H04L 51/12* (2013.01); *G06F 21/6209* (2013.01); *H04L 51/34* (2013.01); *H04L 51/063* (2013.01)

(58) Field of Classification Search
None
See application file for complete search history.

(56) References Cited

U.S. PATENT DOCUMENTS

| 7,657,935 | B2 | 2/2010 | Stolfo | |
|---|---|---|---|---|
| 7,689,676 | B2 | 3/2010 | Vinberg | |
| 7,730,148 | B1 | 6/2010 | Mace | |
| 8,370,948 | B2* | 2/2013 | Troyansky | 726/26 |
| 8,407,345 | B2* | 3/2013 | Lim | 709/225 |
| 2004/0054886 | A1* | 3/2004 | Dickinson et al. | 713/153 |
| 2004/0255147 | A1* | 12/2004 | Peled et al. | 713/200 |
| 2004/0260924 | A1* | 12/2004 | Peled et al. | 713/166 |
| 2005/0025291 | A1* | 2/2005 | Peled et al. | 379/88.13 |
| 2007/0150521 | A1 | 6/2007 | Vedula et al. | |
| 2008/0301760 | A1* | 12/2008 | Lim | 726/1 |
| 2009/0222897 | A1* | 9/2009 | Carow | H04L 63/08 726/6 |

(Continued)

FOREIGN PATENT DOCUMENTS

EP    1193925 A2    3/2002

OTHER PUBLICATIONS

Best Practices for Preventing Enterprise Data Loss, RSA, 2007.*

(Continued)

*Primary Examiner* — Minh Dinh
(74) *Attorney, Agent, or Firm* — Damon Rieth; Tom Wong; Micky Minhas (57) ABSTRACT

System and methods for the implementation and/or enforcement of an email policy for an organization's email system are presented. A Data Loss Prevention (DLP) policy may be implemented on top of the email system. In one embodiment, the DLP policy may comprise modules and/or processing that tests emails for such sensitive data within emails. If an email comprises such sensitive data, then the DLP policy directives may specify processing to be applied as part of each stage of mail processing, from authoring to mail processing on the server and delivery. A single policy may be authored and managed that will apply the policy directives uniformly across all aspects of the message lifecycle. Each of the message policy enforcement systems may evaluate the single policy definition and apply the policy directives in a manner consistent with the contextual evaluation of the policy.

17 Claims, 5 Drawing Sheets

(56) References Cited

U.S. PATENT DOCUMENTS

2010/0299399 A1    11/2010  Wanser
2011/0191213 A1*    8/2011  Mora .................... G06Q 40/12
                                                    705/30
2012/0079275 A1     3/2012  Tsao
2013/0198618 A1*    8/2013  Tanzer ................ G06F 21/604
                                                    715/255

OTHER PUBLICATIONS

When Data Loss Prevention Is Not Enough: Secure Business Communications with Email Encryption, WatchGuard Technologies, 2011.*

Compliance features in Exchange Online. —Retrieved Date: Jan. 20, 2012 Author: Bharat Suneja. http://community.office365.com/en-us/w/exchange/compliance-features-in-exchange-online.aspx.

Group Technologies—The E-Mail Compliance Company—Retrieved Date: Jan. 20, 2012 http://www.group-technologies.com/en/products/elm/intro.php.

Enforcing Corporate Compliance Policies in Your Lotus Notes® Email—Retrieved Date: Jan. 20, 2012 http://www.sherpasoftware.com/customer-support/white-papers/download/11.

PCT, International Search Report and Written Opinion of the International Searching Authority, PCT/US2013/049803, Mailing Date Oct. 14, 2013.

* cited by examiner

UNIFORM POLICY FOR SECURITY AND INFORMATION PROTECTION

BACKGROUND

Modern organizations find it desirable to apply policies for information protection across the lifecycle of that information. For example, in the context of information protection as part of an e-mail, the lifecycle includes from creation/authoring, to transport and deliver, to consumption. Throughout the lifecycle of the information, organizations need to be able to take a single policy, and apply it consistently across the set of policy enforcement points applicable to the information. For e-mail, the policy enforcement points may include the e-mail client application at time of e-mail authoring, e-mail servers applying the policy in transit, may storage and delivery systems and e-mail clients during the e-mail consumption.

Typically, an organization would have to author separate policies for the various policy enforcement points like parameter and internal mail servers, Mailbox storage systems, and E-mail clients like Microsoft Outlook® software in order to achieve these goals.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for systems and/or methods for the implementation and/or enforcement of an email policy for an organization's email system are presented. A Data Loss Prevention (DLP) system may be implemented as part of the email system to affect an e-mail policy enforcement. In one embodiment, the DLP system may comprise modules and/or processing that apply a DLP defined policy. Such DLP policy may define what is considered sensitive information, how should that information be treated during the various stages of the e-mail lifecycle, such as e-mail authoring, email processing, e-mail auditing, and e-mail delivery mechanisms. In one embodiment, a single, common DLP Policy may be used to control all aspects of the e-mail lifecycle.

In some embodiments, system and methods for the implementation and/or enforcement of an email policy for an organization's email system are presented. A DLP policy may be implemented on top of the email system. In one embodiment, the DLP policy may comprise modules and/or processing that tests emails for such sensitive data within emails. If an email comprises such sensitive data, then the DLP policy directives may specify processing to be applied as part of each stage of mail processing, from authoring to mail processing on the server and delivery. A single policy may be authored and managed that will apply the policy directives uniformly across all aspects of the message lifecycle. Each of the message policy enforcement systems may evaluate the single policy definition and apply the policy directives in a manner consistent with the contextual evaluation and enforcement of the policy. For example, a policy directive that identifies sensitive information may allow user override of the policy before sending the sensitive information. In this example, when sensitive information is detected, a user would provide a user notification of the discovered sensitive information and may insist that the user acknowledge sending of the sensitive information when evaluated in the authoring context. It may be desired that the same policy would test for the presence of the sender's override in the mail Meta-data when evaluated on the mail server or result in a Non-Delivery Report (NDR).

One method embodiment comprises the steps of scanning and analyzing the email content for what is defined by the common policy as the sensitive information. Using a single policy definition of what is sensitive content is applied uniformly across the message content and any attachments contained within the message. The common policy definition is uniformly applied to extracted content in different types of file types that may be represented in attachments.

One method embodiment comprises the steps of: receiving an email at said email server; sending the email to a DLP system module; the module applying the common DLP policy interpreted in the context of the e-mail server. Upon detecting sensitive data within the email, as defined by the common policy definition, applying the processing directives as specified in the policy. One such policy directive may be to reject mail messages unless the sender has decided to override the policy. Such override may be signaled by the presence of an override header within the email; if no override header is present in the email, sending an indication of at least one of a set of actions back to the user/author according to currently enabled processing modes in the DLP policy; and if an override header is present in the email, processing the email further according to DLP policy. Another policy directive may instruct to educate the users as to the sensitive information detected in the mail. For this policy directive, the email server would skip this directive as no-education directive is available nor enforced in the e-mail server. Another policy directive may instruct to reject mail submissions upon the detection of sensitive content, in which case the server would reject the e-mail message.

In addition, one embodiment of a system is provided that comprising an email server; a set of email clients, the email clients in communication with the email server; a DLP system module, the DLP policy module capable of enforcing a set of policy rules upon emails authored by users of the email system; and wherein the DLP policy module further comprising a set of action modules, the action modules capable of testing the emails for sensitive data, determining if the emails contain the policy defined sensitive content, and applying the policy directives within the context of the authoring experience. One such policy directive may be to reject mail messages unless the sender has decided to override the policy. Such override, when evaluated in the authoring context, may result in insisting the user to override the mail policy before sending the mail. The user override action would then be recorded in the email as part of the policy processing data, for example as part of message header or MIME message content. If no override would be provided by the user, the sender would be prevented from sending the message per the common policy definition. Another policy directive may instruct to educate the users as to the sensitive information detected in the mail. For this policy directive, the authoring context may present information to the user of the detected sensitive content and the applicable policies governing that information without impacting the user's ability to transmit the information. Another policy directive may instruct to reject mail submissions upon the detection of sensitive content. For this policy directive, the authoring context may prevent the user from submitting the message into the mail system.

In addition, one embodiment comprises the steps of: delivering an email at said email server to the recipient's mailbox; sending the email to a DLP system module; the module applying the common DLP policy interpreted in the context of the e-mail mailbox delivery system; the DLP policy module capable of enforcing a set of policy rules upon emails delivery system; and wherein the DLP policy module further comprising a set of action modules, the action modules capable of testing the emails for sensitive data, determining if the emails contain the policy defined sensitive content, and applying the policy directives within the context of the delivery system. One such policy directive may be to reject mail messages unless the sender has decided to override the policy. Such override, when evaluated in the delivery context, may result in insisting that the message have a header present indicating a previous action of the sender to override the mail policy before sending the mail. If no override header would be present, the mail would be removed and not delivered to the user. Another policy directive may instruct to educate the users as to the sensitive information detected in the mail. For this policy directive, the delivery context may apply disclaimer notifications to the mail indicating the presence of the sensitive information and insisting the receiver acknowledgement of the presence of this information before accessing the message content. Another policy directive may instruct to reject mail submissions upon the detection of sensitive content. For this policy directive, the delivery system would discard any messages received.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

Several embodiments of the present application disclose systems, methods and mechanisms that affect an email policy object model that may comprise:

(1) Semantics to express that a single policy definition may be shared in multiple policy enforcement points such as authoring, transport, delivery, audit with the appropriate action for each. The format for the common policy definitions which includes policy directive descriptions, definition of sensitive information and rules for its detection, policy overrides directive, policy education and notification directives, false positive reporting.

(2) Single policy object which expresses the definition and heuristics for discovery of sensitive information across multiple policy enforcement points such as authoring, transport, delivery, audit etc.

(3) Multiple modes for a policy that affect its application within each policy enforcement points and results in a contextual application within it. Test mode that allows administrators to model the impact of the policy before it is enforced. Test mode with notifications that educates and notifies the Information Workers (IWs) about the impact of the policy before it is enforced. Enforcement mode which both communicates the policy to admin and IW and enforces the policy directive.

(4) Semantics to express at authoring time that the policy may be overridden by the end user and the modifications respected in transport, delivery, at rest.

(5) Semantics for modeling the user interface affects as part of policy creation.

(6) Multiple linked objects which express the policy in different locations such as e-mail client, transport, mailbox.

(7) Formats for carrying policy modification from the end user along with the e-mail so that they can be respected in transport, delivery, at rest, etc. Includes policy overrides, false positive reporting.

(8) Aggregation and presentation of the policy audit information collected across the different policy enforcement mechanisms through the lifecycle of the information protection such as e-mail client, transport, and rest.

Several operations that may operate upon the policy may comprise: Creation, Update, Reads, Deletions of the object and linked objects that express the policy in different locations In addition, the runtime behavior for mail subject to the policy may comprise: Detection, Enforcement, Logging, Reporting, and End user policy directive interactions.

One Embodiment

Figure 1:
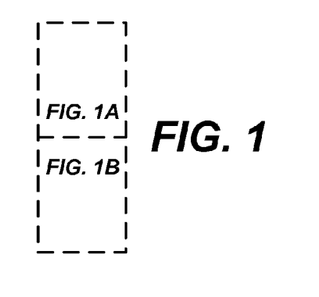
FIG. 1 depicts one embodiment of a system that affects policy systems as made in accordance with the principles of the present application.
Figure 1A:
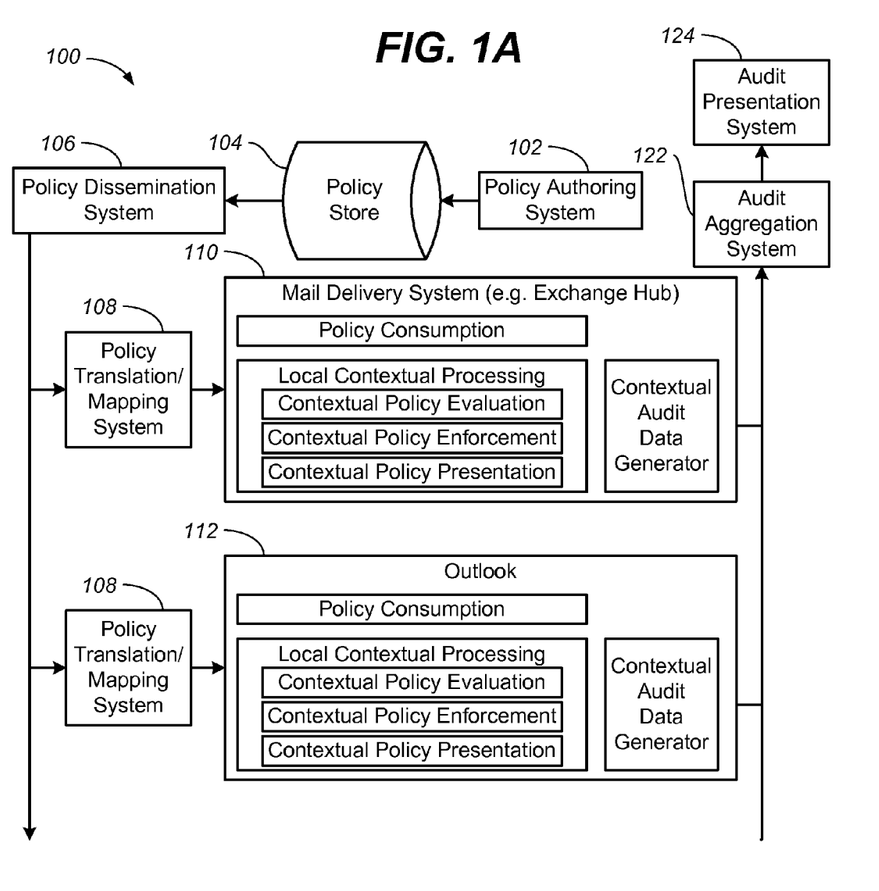
Figure 1B:
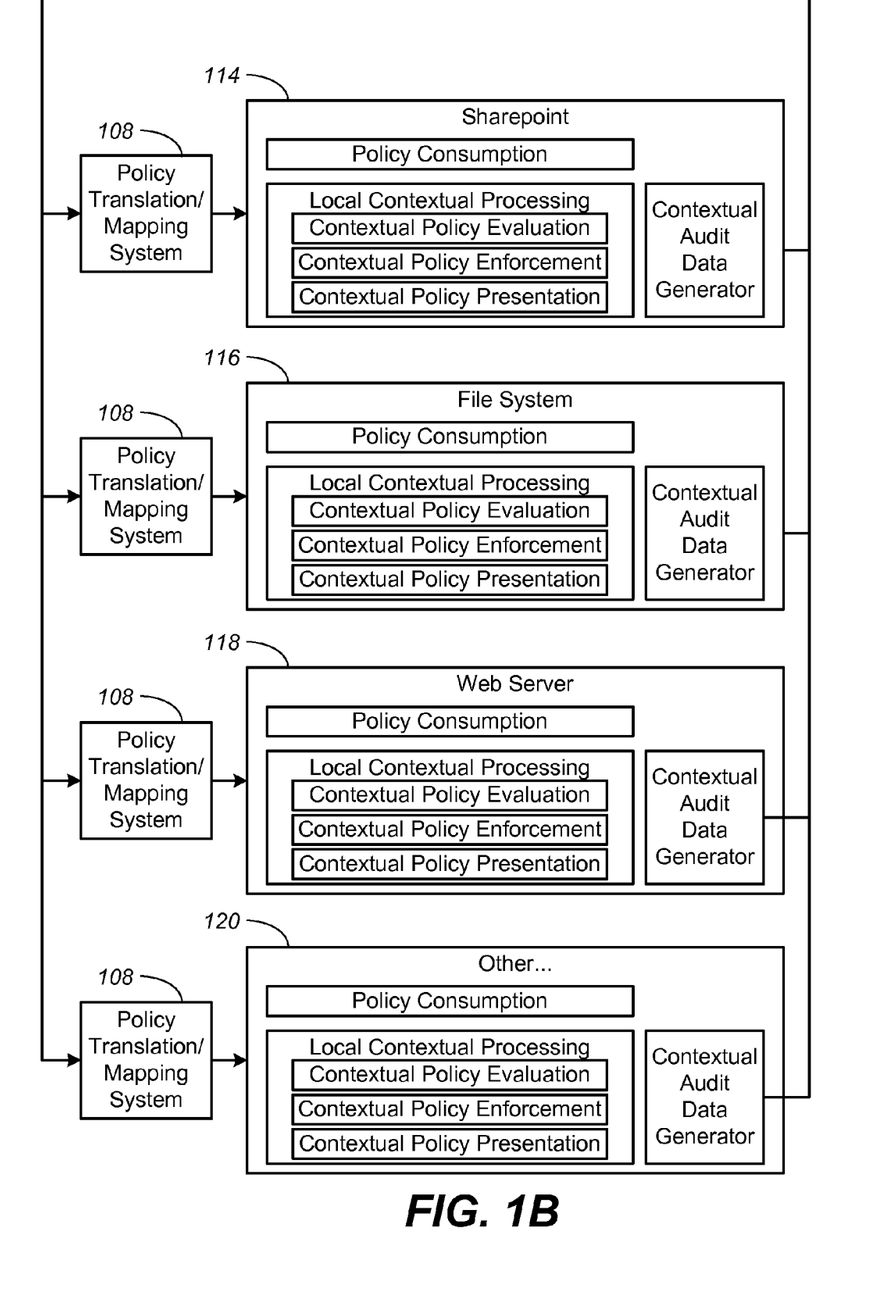

FIG. 1 is a schematic diagram of a policy system as made in accordance with the principles of the present application.

As may be seen in this embodiment, there may be several general policy modules that may work with various electronic storage and/or servers that may be set across a given organization. Broadly, there may be a Policy Management System, multiple policy enforcement points, and an Audit System for the setting and testing of a policy, respectively.

As may be seen in FIG. 1, Policy Management System 100 may comprise a policy authoring system 102, a policy store 104, a policy dissemination system 106. As will be discussed in further detail herein, these policy modules may be employed to set and disseminate a policy for the organization. Policy may be affected by various policy translation/mapping systems 108—which understand the generic policy directives and transform them to the contextually understood format by the policy enforcement points, which may interface with various electronic data subsystems—e.g., Mail Delivery Systems 110, mail client systems like Microsoft Outlook® system 112, information management systems like Microsoft Sharepoint® system 114, File Systems 116, Web Server 118 or other suitable electronic data subsystems that are capable of policy enforcement and application.

Within these policy enforcement subsystems, there may be modules therein that implement the policies effectively within the subsystems. For example, such modules may be policy consumption, local contextual processing—which may further comprise contextual policy evaluation, contextual policy enforcement, and contextual policy presentation.

As a part of these subsystems, it may be desirable to have a contextual audit data generator. These audit data generators may be in communication with an audit aggregation system 122 and an audit presentation system 124.

It should be appreciated that many other architectures are possible for implementing a policy system that may interface with an organization's software suite—e.g., email, file servers, web interfaces and the like. In addition, it may be possible (and maybe desirable) for certain policy modules (for example, the policy authoring and store, and audit functions) to be hosted apart from the organization and supplied otherwise (e.g., server/client relationship, cloud-based services or the like).

Figure 2:
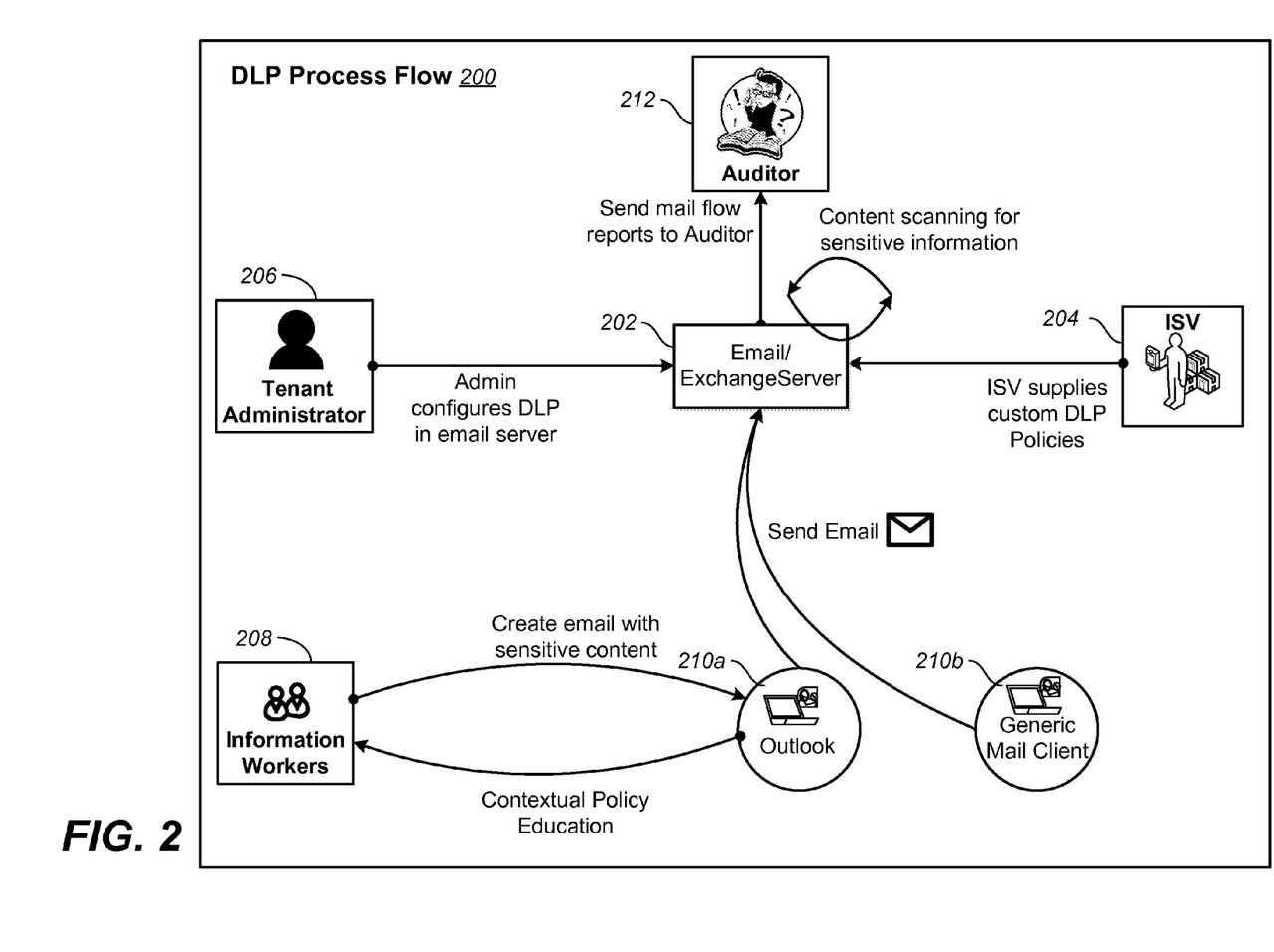
FIG. 2 depicts one embodiment of an implementation and operation of a policy system in a context of e-mail as made in accordance with the principles of the present application.

Once a policy system is implemented or otherwise configured for an organization, such policy systems take on a runtime dynamic. FIG. 2 depicts one embodiment of a runtime dynamic 200, as it might apply to an exemplary email flow policy application. The organization will typically have its email system and/or server 202 prior to the implementation of a policy system that will operated on top of, or otherwise cooperatively, with the email system.

The policy system may consume policy content from multiple sources. One such source may be as supplied with the system itself in the form of out-of-box (OOB) set of policy templates that are available as part of the product and may be acquired and installed by a tenant system administrator and/or other suitable users 206. Another source may be from Independent Software Vendors (ISVs) and product partners, and consultants that provide custom policy content for the consumption by the target organization. 204 may supply the organization with custom DLP policies. In either case, administrator 206 may perform particular configuration of a DLP policy system—in this case, working with the organization's email system. In addition to the installation/creation of the policy, it may be desirable that ongoing policy maintenance and tuning may be performed by in-house personnel or external contractors or vendors—such as the tenant administrator or by the ISVs, partners, and/or consultants. These may be represented by multiple operations such as 206 and 204.

In operation, the policy directives may include operations in contexts that the information workers interact with, such as Outlook 210a or generic email client 210b, that may result in the active education and/or notification of the policy to the organization's users. The policy directives would determine what content is considered sensitive and define the rules governing its usage/handling within the organization. Both, what is the sensitive content and rules governing its usage can be disseminated to both the electronic file systems (via the policy dissemination module of FIG. 1)—as well as the end users, as part of the policy directives, by sending indications and/or notifications of actions taken (or to be taken) by the system. (e.g., email with patient information, trade secret information or the like) in response to common policy directives being triggered. The policy directive may allow the user of sending this information unrestricted, require explicit acknowledgement that the communication contains sensitive information and the user takes responsibility for its disclosure, or prevention of sharing outright.

Once received, email server may process the email according to the same policy definition for policy consideration, compliance and/or processing directly (or the policy system may be operating apart from the email server in a server/client relationship or the like) by a DLP evaluation module. Once the email is scanned for sensitive content, additional actions may take place such as holding the email prior to sending outside the email server, the organization or the like. Any non-compliance with policy (or period reports of generally compliant email traffic) may be sent to an auditor 212 for follow up. Such follow-up may be to retrain affected employees—or it may detect some error in the dynamic flow and/or operation of the policy system. Any policy processing errors may be referred back to either the system administrator or to the ISV for correction. The mail processing server will enforce that the policy was uniformly applied no matter what client was used as part of the authoring experience. If the policy requires sender acknowledgements, these may be enforced for presence or the mail will be rejected back to the sender.

Figure 3:
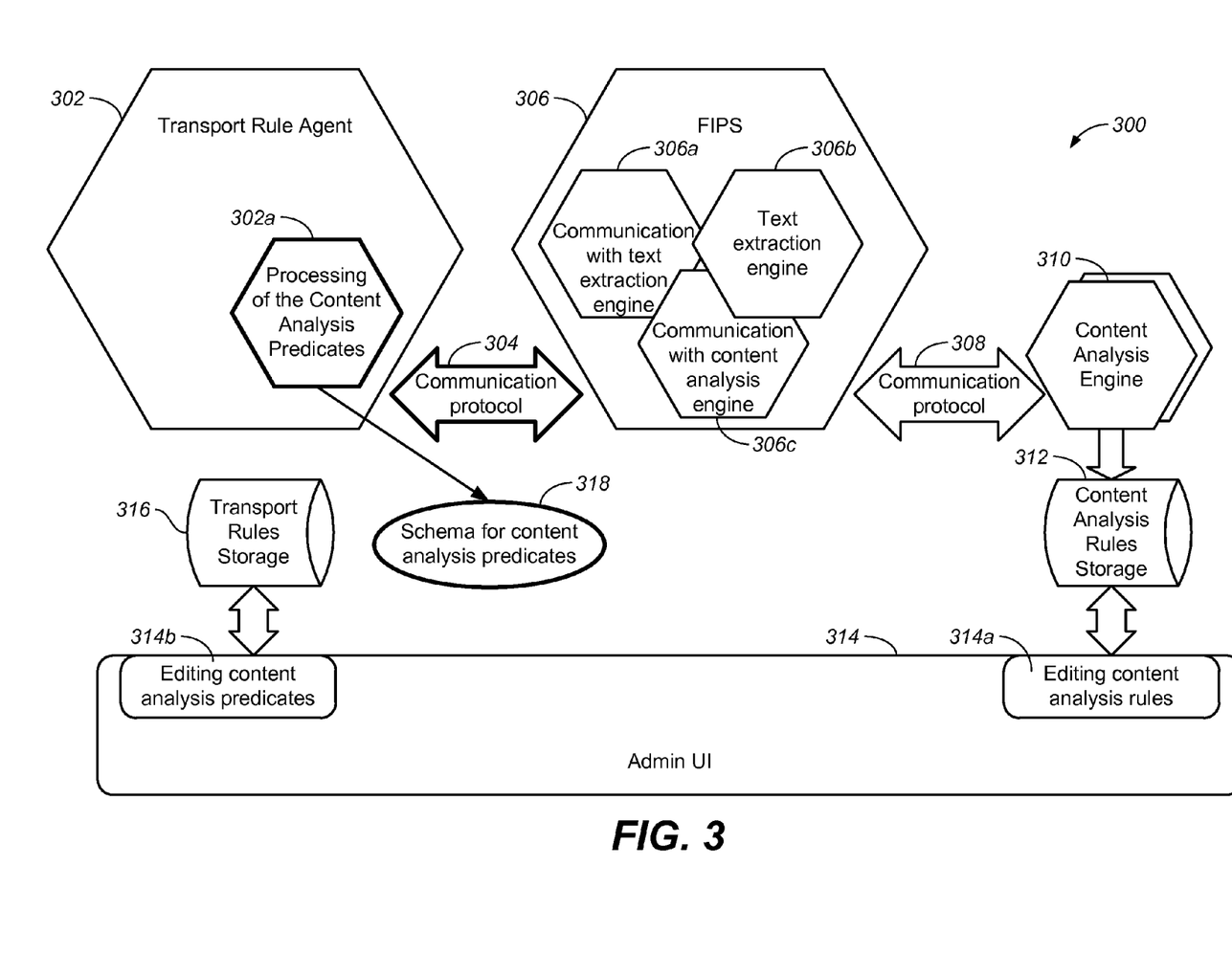
FIG. 3 depicts one embodiment of a system mail server processing subsystem as it may interface with a policy system in the context of e-mail.

FIG. 3 is the e-mail server processing details of the policy application—e.g. exchange server (box 202 in FIG. 2). FIG. 3 depicts one possible embodiment of a system mail processing subsystem 300 as it may interface with a policy system. The e-mail server's policy processing may be performed by an agent that is activated at various stages of mail processing. One such agent could be the exchange transport rules agent 302 which may employ processing of content analysis predicate 302a in conjunction with schema for content analysis predicated 318. Transport rules may be stored in 316 and administrators/user may edit content analysis predicates with module 314b via a UI 314.

The agent may interface with a message content and attachment text extraction module (referred to herein as "FIPS") 306 and content analysis module to scan for sensitive content. FIPS may be affected as a component that does the content extraction and conversion to text (e.g., both mail messages and attachments) and may pass the extracted content into the classification engine for analysis of any sensitive content as defined by the policy directives. FIPS may comprise a text extraction engine 306b and communication modules with text extraction engine and the content analysis engine, 306a and 306c respectively. FIPS may be the same as the DLP policy evaluation—e.g., it may be constructed as a sub-component making up DLP policy evaluation module—i.e., the one that does text extraction which is then fed into the classification engine for analysis for any sensitive information as defined by the DLP policy.

The text extraction module may interface (perhaps via a communication protocol 308) with the content analysis/scanning engine/module 310 which may perform the text analysis on the text identified with the e-mail bodies and any attachments. The text analysis engine may identify sensitive content based on the policy information which has been stored in the content rules store 312 such as AD. Such rules may be edited by administrators/users via module 314a via UI 314.

Single Policy Directive

As noted herein, a DLP policy may be implemented on top of the email system. In one embodiment, the DLP policy may comprise modules and/or processing that tests emails for such sensitive data within emails. If an email comprises such sensitive data, then the DLP policy directives may specify processing to be applied as part of each stage of mail processing, from authoring to mail processing on the server and delivery. A single policy may be authored and managed that will apply the policy directives uniformly across all aspects of the message lifecycle. Each of the message policy enforcement systems may evaluate the single policy definition and apply the policy directives in a manner consistent with the contextual evaluation and enforcement of the policy. For example, a policy directive that identifies sensitive information may allow user override of the policy before sending the sensitive information would provide a user notification of the discovered sensitive information and may insist that the user acknowledge sending of the sensitive information when evaluated in the authoring context. It may be desired that the same policy would test for the presence of the sender's override in the mail Meta data when evaluated on the mail server or result in a Non-Delivery Report (NDR).

Common policy directives may comprise a set of policy directive primitives and/or definitions that the administrator or other suitable users find as desired treatment for the implementation of policy across an entire lifecycle of an email or other electronic document. Many such common policy directive definitions and/or primitives are given throughout this application.

In other embodiments, the common policy directives could be construed and/or selected as common and/or fundamental and/or primitive to a set of different policies (that the organization may want to apply) and/or a set of different electronic file systems (such as email, web server, file servers or the like). For merely one example, different regulatory policies may be conceived as having a common set of directives and associated actions that appear common to that set of regulatory policies. The same may be implemented for organizational policy or any set of policies (emanating from whatever source) may apply. Once the common policy directives are defined, these directives may be disseminated to the organization's electronic servers, as is desirable by an administrator or other suitable entity. At any time during the lifecycle of an email (authoring, sending or the like), the email system may check to see if any single policy directive has been triggered, and if so, to apply any action associated with the directive.

In one embodiment, the systems and/or methods may comprise components implementing the steps of scanning and analyzing the email content for what is defined by the common policy as the sensitive information. Using a single policy definition of what is sensitive content may then be applied uniformly across the message content and any attachments contained within the message. The common policy definition is uniformly applied to extracted content in different types of file types that may be represented in attachments.

In another embodiment, the systems and/or methods may comprise components implementing the steps of: receiving an email at said email server; sending the email to a DLP system module; the module applying the common DLP policy interpreted in the context of the e-mail server. Upon detecting sensitive data within the email, as defined by the common policy definition, applying the processing directives as specified in the policy. One such policy directive may be to reject mail messages unless the sender has decided to override the policy. Such override may be signaled by the presence of an override header within the email; if no override header is present in the email, sending an indication of at least one of a set of actions back to the user/author according to currently enabled processing modes in the DLP policy; and if an override header is present in the email, processing the email further according to DLP policy. Another policy directive may instruct to educate the users as to the sensitive information detected in the mail. For this policy directive, the email server would skip this directive as no-education directive is available nor enforced in the e-mail server. Another policy directive may instruct to reject mail submissions upon the detection of sensitive content, in which case the server would reject the e-mail message.

In addition, one embodiment of a system is provided that comprising an email server; a set of email clients, the email clients in communication with the email server; a DLP system module, the DLP policy module capable of enforcing a set of policy rules upon emails authored by users of the email system; and wherein the DLP policy module further comprising a set of action modules, the action modules capable of testing the emails for sensitive data, determining if the emails contain the policy defined sensitive content, and applying the policy directives within the context of the authoring experience. One such policy directive may be to reject mail messages unless the sender has decided to override the policy. Such override, when evaluated in the authoring context, may result in insisting the user to override the mail policy before sending the mail. The user override action would then be recorded in the email as part of the policy processing data, for example as part of message header or MIME message content. If no override would be provided by the user, the sender would be prevented from sending the message per the common policy definition. Another policy directive may instruct to educate the users as to the sensitive information detected in the mail. For this policy directive, the authoring context may present information to the user of the detected sensitive content and the applicable policies governing that information without impacting the user's ability to transmit the information. Another policy directive may instruct to reject mail submissions upon the detection of sensitive content. For this policy directive, the authoring context may prevent the user from submitting the message into the mail system.

In addition, one embodiment comprises the steps of: delivering an email at said email server to the recipient's mailbox; sending the email to a DLP system module; the module applying the common DLP policy interpreted in the context of the e-mail mailbox delivery system; the DLP policy module capable of enforcing a set of policy rules upon emails delivery system; and wherein the DLP policy module further comprising a set of action modules, the action modules capable of testing the emails for sensitive data, determining if the emails contain the policy defined sensitive content, and applying the policy directives within the context of the delivery system. One such policy directive may be to reject mail messages unless the sender has decided to override the policy. Such override, when evaluated in the delivery context, may result in insisting that the message have a header present indicating a previous action of the sender to override the mail policy before sending the mail. If no override header would be present, the mail would be removed and not delivered to the user. Another policy directive may instruct to educate the users as to the sensitive information detected in the mail. For this policy directive, the delivery context may apply disclaimer notifications to the mail indicating the presence of the sensitive information and insisting the receiver acknowledgement of the presence of this information before accessing the message content. Another policy directive may instruct to reject mail submissions upon the detection of sensitive content. For this policy directive, the delivery system would discard any messages received.

Email System Embodiment with NotifySender Action

Figure 4:
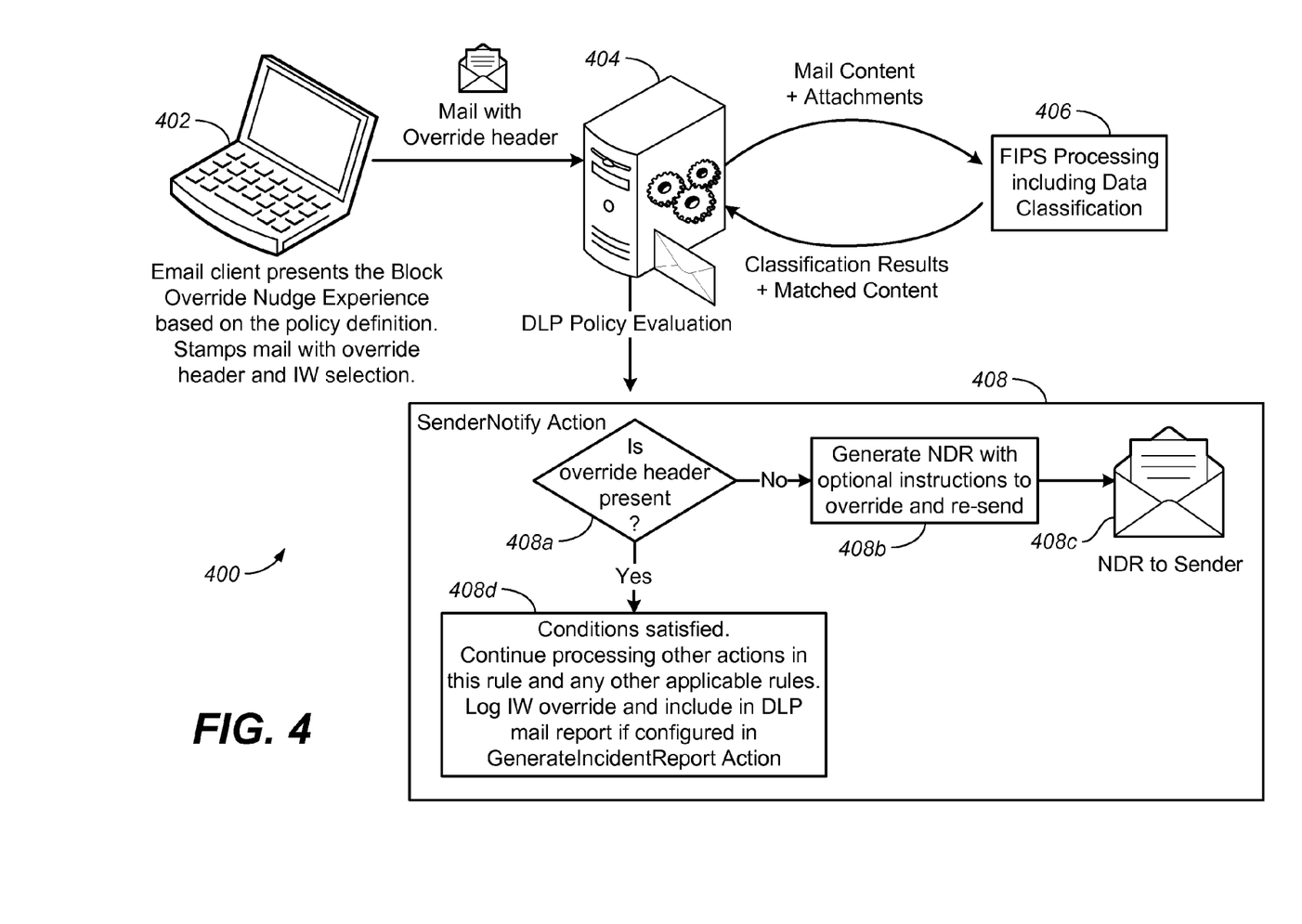
FIG. 4 is one embodiment of one exemplary DLP policy directive, as it might be implemented for a putative customer email system in the context of the authoring and processing subsystems.

FIG. 4 depicts one embodiment of an email system 400 comprising DLP policy and affecting a NotifySender Action as made in accordance with the principles of the present application. NotifySender is an exemplary DLP policy directive. As may be seen, a user may interface with an email client on a laptop, computer and/or terminal 402. In this case, the user may be crafting an email and the email client will apply any applicable policy. The policy will be interpreted in the authoring context for evaluation and application. For example, a Block Override Nudge policy experience which will prevent the user from sending a message with identified sensitive content unless the user has explicitly overridden the policy to allow an exception. Such experience may be based upon the policy definition. The result of the user's actions will be recorded in the message in the header information and/or MAPI properties of the message, indicating the user's policy action if any. In one embodiment, a Block Override may be affected as a policy directive that will block sending of the mail unless the user has explicitly overridden the policy action and acknowledges the disclosure of the sensitive information identified by the policy. It will be appreciated that Block Override is just one example of a policy directive. Another example may be a Notification and Blocking described earlier.

In this example, because the user overrides the policy action, and the policy directive allows the sender to override the policy, the user's email is modified to also include meta data describing the user's actions (MAPI properties and mail header information) This email is ultimately received by the email server 404 and the server 404 may have the email evaluated and processed by several processes. The server processes ensure the policy is being applied consistently and uniformly. This includes the server evaluating the policy directives, which may require the re-scan of the content, and if any sensitive content is discovered matching the policy directive, evaluating that the policy directive has been applied per definition and applying further processing. In policy directives that require a user action at the previous stages of mail processing lifecycle (like authoring), the server validates that the mail contains the expected user operations recorded in it. In one embodiment, the email, its contents and its attachments are sent forward to FIPS processing and its associated data classification result, per the policy directive. If the policy defined IW/sender actions have not been applied, the policy results in the email being rejected by the mail server.

The email (and optionally, the results from FIPS processing) may be sent forward from the email server to a DLP Policy Evaluation. Alternatively, both the DLP Policy Evaluation and/or the FIPS processing may reside at the email server and processing may be performed locally.

In one embodiment, once the email is sent to the DLP Policy Evaluation module, the email and any of its associated data may be examined for the inclusion of any sensitive data with the data and/or metadata associated with the email. If such sensitive data is detected, then the email system may take a number of actions, depending on what is defined in the DLP policy directives.

For one example, (and as may be seen as part of the DLP Policy Evaluation in FIG. 4), the email and associated data/metadata may be sent to one processing module—e.g., NotifySender Action 408. As shown in FIG. 4, NotifySender may inquire (at 408*a*) whether there is an override header present in the email. If not, the system may generate a NDR at 408*b*—and optionally, include additional instructions to the sender in the NDR instructing them on how to override the original mail and re-send the email. Such email may be sent at 408*c*. Alternatively, if the DLP policy directive required an override and such override was present then the DLP policy directive is satisfied 408*d* and further policy directives will be evaluate and applied. The system will continue to process the email in accordance with the DLP policy directives that are applicable to this mail. Per other DLP policy directives, the system may also log the IW's override and include such override in a DLP mail report that would be sent to the auditor mailbox. It will be appreciated that NotifySender action is one of many possible policy directives that the DLP Policy may affect and/or enable. Such different modules may be enabled at different times for different purposes, according to rules set by the administrator, other users or entities.

In another embodiment, an email system having a DLP policy module may further comprise a single policy enforcement module. Such a single policy enforcement module may be able to propagate, share or otherwise make available any information regarding actions taken for enforcement of policy directives and/or rules and make such information available to other electronic file systems and any associated policy modules.

NotifySender

As noted, NotifySender action may be employed to configure DLP policy directive that is both evaluated in the email client policy enforcement point (outlook) and also the same directive is enforced by the mail server policy enforcement. In one embodiment, NotifySender action may augment email system configurations that may employ other mechanisms—e.g., policy nudge rules (PNRs). This action maps to the policy nudge, block nudge and block override nudge client experiences. The action may Non-Delivery Report (NDR) the message depending on the configuration and the action taken by the sender.

The following table describes in greater detail the "NotifySender Action":

| Action Name | NotifySender |
|---|---|
| Action Parameters | One of the following enum values: {NotifyOnly, RejectMessage, RejectUnlessFalsePositiveOverride, RejectUnlessSilentOverride, RejectUnlessExplicitOverride} |
| Description | Defines a DLP policy directive that is both evaluated on the server and in |

| | |
|---|---|
| Example | the outlook client policy enforcement points. On the outlook client, it controls the policy nudge, block nudge and block override nudge policy configurations. Depending on the sub-option, may represent policy action only on the client or also processing on the server.<br>new-transportRule "pci-dss" - sentToScope NotInOrganization - MessageContainsDataClassification @{Name="Social Security Number"} - GenerateIncidentReport dlpincidents@acme.org - ReportSeverityLevel High - NotifySender RejectUnlessExplicitOverride - RejectMessageReasonText "Mail flow policy prevented delivery of this mail based on detected sensitive content" |

Additional Embodiments of NotifySender

The following comprise additional modes of processing for NotifySender actions:

(1) NotifyOnly—This may embody "Client-only" behavior. This may be substantially equivalent to the "policy nudge client" experience—and may have no appreciable impact on mail flow aside from educating the user of the presence of the sensitive information as defined by the policy.

(2) RejectMessage—This may be substantially equivalent to the "block policy nudge" client experience. In this embodiment, the server may NDR the message. In addition, false positive submissions from the client may result in NDR as well.

(3) RejectUnlessFalsePositiveOverride—The client may indicate sensitive content detected and allows sender to override as false positive (as seen in FIG. 4). In addition, a transport rule agent may NDR message unless false positive header is present.

(4) RejectUnlessSilentOverride—NDR message may be sent unless sender has indicated override header (false positive or other). Client indicates sensitive content has been detected and allows sender to override because of false positive or other reason.

(5) RejectUnlessExplicitOverride—NDR message may be sent unless sender has indicated override header (false positive or other)—same server behavior as RejectUnlessSilentOverride. Client indicates sensitive content has been detected and allows sender to override because of false positive or other reason and sender may enter justification.

Two other policy directives—RejectMessageReasonText and RejectEnhancedStatusCode—may be combined with this action to customize the NDR behavior. These directives may be applicable to any condition for which the action results in a NDR. When specified with NotifyOnly, a warning should be emitted that the option will not be used on the server processing since NotifyOnly implies client only processing.

Incident Reporting and Auditing

In some embodiment, the system may generate reports of detected sensitive information and resulting actions carried on the email per the definitions in the policy directive. The GenerateIncidentReport policy directive will generate the incident report even if the evaluation of the policy directive results in the message's NDR. The report may include client-supplied content, including the following possible additional details in the incident report: (1) if sender override was specified; (2) any business justification text submitted by the sender (if any); and/or (3) if sender marked the mail as false positive.

In addition to incident reporting, the policy system includes an audit directive. The auditing module may report to the system, administrator or other authorized entities the DLP policy directives applied to the mail content. The auditing module may send a compilation of data that is comprised in the incident reports, possibly happening over a specified period of time. In one embodiment, policy directive auditing may be implemented and may result in the inclusion of client-supplied content indicating: (1) if sender override was specified; (2) any business justification text submitted by the sender (if any); and/or (3) if sender marked the mail as false positive What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for providing a data loss prevention (DLP) policy on an organizational file system, said organizational file system comprising a plurality of electronic data subsystems, on a single policy directive basis, said organizational file system comprising a server and a set of clients, said clients in communication with said server, said DLP policy comprising a set of modules, the steps of said method comprising:

defining a set of single policy definitions, said single policy definition comprising a directive and an associate action, said single policy definitions capable of applying to a file stored within at least one of the electronic data subsystems throughout an entire lifecycle of said file;

disseminating said set of single policy definitions;

processing the file within at least one of the electronic data subsystems, said file authored by a user; and if one of the single policy directive is triggered at two or more times during the lifecycle of said file, applying an action associated with said single policy action;

sending to end-users an indication of actions and contextual information regarding the policy being triggered; and sending the user a Non Delivery Report (NDR) message, if a policy directive that identifies sensitive information may allow user override of the policy before sending the sensitive information;

sending a business justification text submitted by the sender, if the sender overrides the policy.

2. The method of claim 1 wherein the step of defining a set of single policy definitions further comprises:

defining a set of policies to be applied to said electronic data subsystems; and selecting a set of common directive and associated actions from said set of policies.

3. The method of claim 1 wherein said step of defining a set of single policy definitions further comprises:

defining a set of policies to be applied to a set of electronic file systems within an organization; and selecting a set of common directive and associated actions from said set of policies.

4. The method of claim 1 wherein said step of disseminating said set of single policy definitions further comprises:

disseminating said set of single policy definitions to said at least one of the electronic data subsystems via a policy dissemination module.

5. The method of claim 1 wherein said step of processing the file within at least one of the electronic data subsystems, said email authored by a user further comprises:

sending the file to a DLP policy evaluation module.

6. The method of claim 1 wherein said actions comprise one of a group, said group comprising: NotifyOnly, RejectMessage, RejectUnlessFalsePositiveOverride, RejectUnlessSilentOverride, RejectUnlessExplicitOverride.

7. The method of claim 1 wherein the step of sending the user a Non Delivery Report (NDR) message further comprises:

requiring the user to acknowledge an override prior to sending the file.

8. The method of claim 7 wherein the step of requiring the user to acknowledge an override prior to sending the file further comprises:

reporting one of a group of details, said group comprising: (1) if sender override was specified, (2) any business justification text submitted by the sender, (3) if sender marked the mail as false positive and (4) client-supplied content.

9. The method of claim 8 wherein the step of reporting one of a group of details further comprises:

sending an incident report to an auditing module within said DLP Policy.

10. An email system for affecting a data loss prevention (DLP) policy, said email system comprising:

an email server;

a set of email clients, said email clients in communication with said email server;

a DLP policy module, said DLP policy module capable of enforcing a set of policy rules upon emails authored by users of said email system, said DLP policy module capable of enforcing said set of policy rules upon said email throughout an entire lifecycle of said email; and wherein said DLP policy module further comprising a set of single policy definitions, said single policy definitions comprising a directive and an associate action, and further wherein said DLP policy module capable of testing said emails for sensitive data as defined in a directive and capable of taking the associated action;

wherein further said DLP policy module is applied to a plurality of electronic data subsystems in addition to said email server; and further wherein said DLP policy module is capable of sending to end-users an indication of actions and contextual information regarding the policy being triggered by end-users interaction; and sending the user a Non Delivery Report (NDR) message, if a policy directive that identifies sensitive information may allow user override of the policy before sending the sensitive information;

sending a business justification text submitted by the sender, if the sender overrides the policy.

11. The system of claim 10 wherein said system further comprises:

a single policy enforcement module, said single policy enforcement module capable of making available information regarding actions taken for said email system to other electronic file systems and their associated policy modules.

12. The system of claim 10 wherein said DLP policy module further comprises:

an incident reporting module, said incident reporting module capable of reporting the triggering of single policy definitions.

13. The system of claim 10 wherein said incident reporting module is capable of sending a report comprising one of a group of details, said group comprising: (1) if sender override was specified, (2) any business justification text submitted by the sender, (3) if sender marked the mail as false positive and (4) client-supplied content.

14. The system of claim 10 wherein said DLP policy module further comprises:

an auditing module, said auditing module providing performance data of said DLP policy module over a specified period of time.

15. One or more computer-readable storage devices comprising executable instructions by a processor, and said processor executing said instructions is capable of performing a method, the method comprising:

disseminating said set of single policy definitions, said single policy definition comprising a directive and an associate action, said single policy definitions capable of applying to a file stored within at least one of a plurality of electronic data subsystems, wherein said plurality of electronic data subsystems comprise an organizational file system throughout an entire lifecycle of said file;

processing said file stored within at least one of a plurality of electronic data subsystems, said file authored by a user;

if one of the single policy directive is triggered at two or more times during the lifecycle of said file, applying an action associated with said single policy action;

sending to end-users an indication of actions and contextual information regarding the policy being triggered; and sending the user a Non Delivery Report (NDR) message, if a policy directive that identifies sensitive information may allow user override of the policy before sending the sensitive information;

sending a business justification text submitted by the sender, if the sender overrides the policy.

16. The one or more computer-readable storage devices of claim 15 wherein said step of defining a set of single policy definitions further comprises:
defining a set of policies to be applied to said at least one of a plurality of electronic data subsystems; and
selecting a set of common directive and associated actions from said set of policies.

17. The one or more computer-readable storage devices of claim 15 wherein said step of disseminating said set of single policy definitions further comprises:
disseminating said set of single policy definitions to said at least one of a plurality of electronic data subsystems via a policy dissemination module.

* * * * *